United States Patent
Dotan-Cohen et al.

(10) Patent No.: US 9,847,014 B2
(45) Date of Patent: *Dec. 19, 2017

(54) PROXIMITY-BASED REMINDERS

(71) Applicant: Microsoft Technology Licensing, LLC, Redmond, WA (US)

(72) Inventors: Dikla Dotan-Cohen, Netanya (IL); Lilach Perry, Tel Aviv (IL); Liron Levin, Kfar (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/588,269

(22) Filed: May 5, 2017

(65) Prior Publication Data

US 2017/0243468 A1 Aug. 24, 2017

Related U.S. Application Data

(63) Continuation of application No. 14/668,708, filed on Mar. 25, 2015, now Pat. No. 9,672,725.

(51) Int. Cl.
*G08B 1/08* (2006.01)
*G08B 21/24* (2006.01)
*H04W 4/02* (2009.01)
*H04L 29/08* (2006.01)

(52) U.S. Cl.
CPC .......... *G08B 21/24* (2013.01); *H04L 67/1061* (2013.01); *H04W 4/021* (2013.01)

(58) Field of Classification Search
CPC ..... G08B 21/24; H04L 67/1061; H04W 4/021
USPC ..... 340/539.11; 455/456.3, 419, 41.2, 414.1, 455/205, 41.1, 422.1, 456.1; 705/2, 705/26.72, 7.32, 7.18; 709/204, 217
See application file for complete search history.

(56) References Cited

U.S. PATENT DOCUMENTS

| | | | |
|---|---|---|---|
| 6,850,837 B2 | 2/2005 | Paulauskas et al. |
| 7,212,827 B1 | 5/2007 | Veschl |
| 8,054,180 B1 | 11/2011 | Scofield et al. |

(Continued)

FOREIGN PATENT DOCUMENTS

| | | |
|---|---|---|
| WO | 2012145004 A1 | 10/2012 |
| WO | 2013184990 A1 | 12/2013 |

OTHER PUBLICATIONS

"People based Reminders—Recognize a Person by their Device", Published on: May 26, 2014, Available at: http://forums.wpcentral.com/cortana/286184-people-based-reminders-recognize-person-their-device-print.html.

(Continued)

*Primary Examiner* — Dhaval Patel
(74) *Attorney, Agent, or Firm* — Holzer Patel Drennan

(57) ABSTRACT

A proximity-based reminder system includes one or more proximity detectors for determining whether a distance between two or more paired electronic devices satisfies various criteria. Data transmissions across a wide area network (WAN) are used to determine whether a distance between paired devices satisfies a first proximity condition. Transmissions across a local area network (LAN) are used to determine whether the distance between the paired devices satisfies a second proximity condition. When the first and second proximity conditions are satisfied, the proximity-based reminder system issues a reminder alert notification to one or more of the paired devices.

20 Claims, 8 Drawing Sheets

(56) References Cited

U.S. PATENT DOCUMENTS

| | | |
|---|---|---|
| 8,537,003 B2 | 9/2013 | Khachaturov et al. |
| 9,672,725 B2 * | 6/2017 | Dotan-Cohen ........ G08B 21/24 |
| 2010/0057481 A1 | 3/2010 | Fein et al. |
| 2012/0088524 A1 | 4/2012 | Moldavsky et al. |
| 2012/0306659 A1 | 12/2012 | Ben-Dayan et al. |
| 2013/0281128 A1 | 10/2013 | Singh et al. |
| 2013/0303189 A1 | 11/2013 | Bennett |
| 2013/0331127 A1 | 12/2013 | Sabatelli et al. |
| 2014/0135036 A1 | 5/2014 | Bonanni et al. |
| 2014/0160157 A1 | 6/2014 | Poulos et al. |
| 2014/0189015 A1 | 7/2014 | Chan et al. |
| 2015/0163765 A1 | 6/2015 | Hobbs et al. |

OTHER PUBLICATIONS

"People Based Reminders", Published on: Aug. 20, 2013, Available at: https://play.google.com/store/apps/details?id=com.brynk.pbr.

Jonsson, et al., "Proximity-based Reminders using Bluetooth", In IEEE International Conference on Pervasive Computing and Communications Workshops, Mar. 24, 2014, pp. 151-153.

"Rumor: 'Remind Me When I'm With This Person' May Be Coming to Google Now", Retrieved on: Sep. 18, 2014, Available at: http://www.androidpolice.com/2014/03/17/rumor-remind-me-when-im-with-this-person-may-be-coming-to-google-now/.

International Searching Authority, U.S. Patent and Trademark Office, International Search Report and Written Opinion for PCT/US2016/023495, dated May 4, 2016, 11 pages.

"Second Written Opinion Issued in PCT Application No. PCT/US2016/023495", dated Feb. 14, 2017, 4 Pages.

\* cited by examiner

PROXIMITY-BASED REMINDERS

The present application is a continuation of and claims benefit to U.S. patent application Ser. No. 14/668,708, filed on Mar. 25, 2015 and entitled "Proximity-Based Reminders," which is specifically incorporated by reference for all that it discloses and teaches.

BACKGROUND

Some personal devices support reminder applications that allow a user to set up self-reminders for various events or 'to-do' tasks. For example, a reminder application may allow the user to set a self-reminder at a particular time, such as "remind me to call the doctor today at 4 pm." Other reminder applications make use of global positioning satellite (GPS) data of a single electronic device to provide location-based reminders, such as "remind me to buy bread when I get to the supermarket." Still other reminder applications allow limited person-based reminders, such as "remind me to tell my husband to bring milk when he calls." However, there are some types of reminders that are valuable when a user meets another person face-to-face, such as a reminder stating: "remind me to give Mia back her key when I meet her."

SUMMARY

Implementations described and claimed herein address the foregoing by providing a proximity-based reminder system that issues reminder alert(s) based on a detected distance between two or more paired devices. Specifically, the proximity-based reminder system allows for receiving, at a first electronic device, a proximity notification via a wide-area network (WAN) indicating that a distance between a first electronic device and a second electronic device satisfies a first proximity condition. Responsive to the receipt of the proximity notification, the proximity-based system determines whether the distance satisfies a second proximity condition, the second proximity condition specifying a decrease in the distance as compared to the first proximity condition. If the distance satisfies the second proximity condition, the proximity-based reminder system issues a reminder alert to the first electronic device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

DETAILED DESCRIPTION

The disclosed technology allows a user device to generate a reminder associating a particular task (e.g., a 'to-do' task) with two or more specified electronic devices. For example, a user device may generate a reminder for a task that is ideally or exclusively performable when two users (e.g., users of first and second devices) are in close proximity of one another. When the specified electronic devices are detected within a predetermined proximity of one another, a proximity detector triggers an alert (e.g., a message, sounds, graphic, etc.) that provides the user with a reminder for the task that can now be performed because the specified electronic devices are within a proximity that facilitates the execution of the task.

Figure 1:
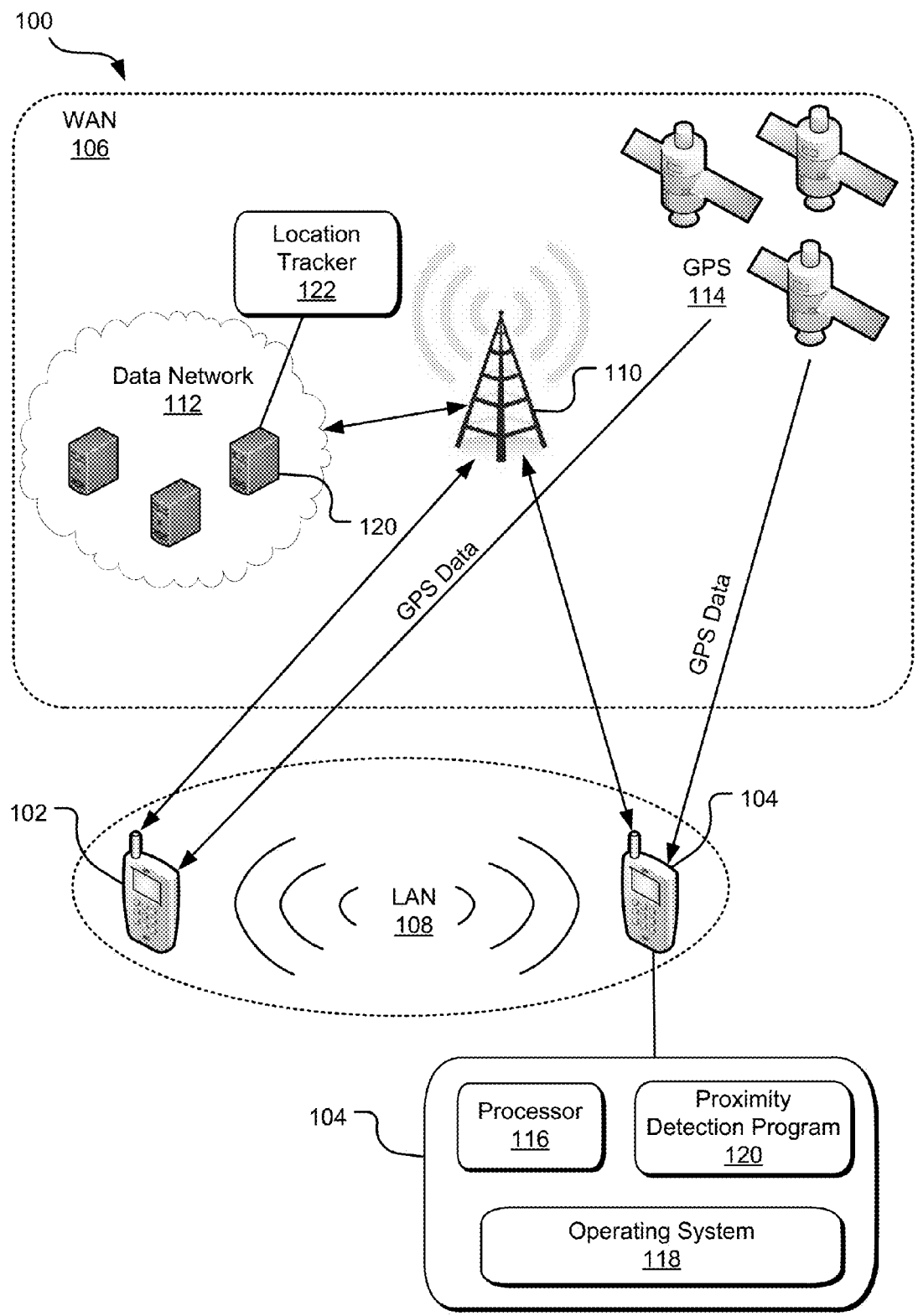
FIG. 1 illustrates an example proximity-based reminder system for issuing reminder alerts based on a detected distance between two or more paired electronic devices.

FIG. 1 illustrates an example proximity-based reminder system 100 for creating proximity-based reminders that issue reminder alerts based on a detected distance between two or more associated devices. The proximity-based reminder system 100 includes at least a first electronic device 102 and a second electronic device 104 including features for generating and saving one or more reminders in association with at least one other electronic device. In one implementation, a user receives a reminder alert via the electronic device 102 when the second electronic device 104 is detected within a predefined proximity range.

The first electronic device 102 and the second electronic device 104 (collectively referred to as the electronic devices 102, 104) are shown as mobile phones but may, in other implementations, be any of a variety of different types of electronic devices including without limitation a tablet, computer, laptop, personal data assistant, smart watch, etc. Each of the electronic devices 102, 104 includes a processor (e.g., a processor 116) for executing an operating system (e.g., an operating system 118) and one or more programs. In particular, each of the electronic devices 102, 104 includes a proximity-based reminder program (e.g., a proximity-based reminder program 120) that may access a receiver and transmitter of the associated electronic device to send information to and receive information from other electronic devices executing the proximity-based reminder program. Further, the electronic devices 102, 104 each include wireless communication circuitry for communicating across a wide-area network (WAN) 106, which may include one or more wireless networks, such as a cellular network (e.g., 3G, 4G, LTE, etc.) including one or more cellular towers 110 sending data to and from one or more servers (e.g., a server 130) in a cloud-based data network 112. Various servers in the cloud-based data network 112 may be coupled to one or more wired telecommunication and/or data communication networks, such as landline telephone networks, the internet, or the like.

The electronic devices 102, 104 may also each include a global positioning system (GPS) receiver for receiving geographical coordinates from GPS satellites 114. Further, the electronic devices 102, 104, each include hardware and/or software for communicating with one another across a local area network (LAN) 108. The LAN 108 facilitates short-range communications within a localized area, such as a BlueTooth network, Wi-Fi network, or other network such as a network based on radio-frequency communications, ultra-frequency sound based communications, etc. As used herein, "short-range communications" refers to communications across a limited geographical distance. In an implementation where the LAN 108 is a BlueTooth network, the short-range communications may be of a distance between about 1 meter and 100 meters depending on the type of BlueTooth utilized. In an implementation where the LAN 108 is a wireless network, the achievable distance of short-range communications is a Wi-Fi range based on an elected frequency band. The WAN 106 can facilitate some short-range communications but also facilitates long-range communications across greater distances.

In one implementation, the first electronic device 102 generates and saves one or more 'proximity-based' reminders. A proximity-based reminder is, for example, a reminder associated with a detected proximity to another electronic device. For example, a first user (e.g., Jenn) may set a reminder on the first electronic device 102 to issue a reminder alert when the second device 104 (e.g., owned by a second user, Jake) is at a same geographical location. The reminder alert includes content selectively saved by the user and associated with a particular task.

A proximity-based reminder may be a self-reminder (e.g., generated by Jenn to alert herself via her own personal electronic device); a reminder to another (e.g., a reminder generated by Jenn to alert Jake via Jake's device); or a multi-party reminder (e.g., a reminder generated by Jenn to alert two or more devices such as Jenn's device, Jake's device, and/or device(s) of additional parties.

In one implementation, a proximity-based reminder is generated on the first electronic device 102 at a time when the second electronic device 104 is far enough away that the electronic devices 102, 104 are incapable of bidirectional communication across the LAN 108. For example, Jenn may generate a reminder (e.g., "remind me to give Jake his key back when I meet him") when she is at work in her office and Jake is miles away from Jenn's office. Throughout the day, geographical locations of the electronic devices 102, 104 are tracked by one or more devices within the WAN 106. For example, a location tracker 122 executed by one or more servers of the data network 112 may receive and/or store and track location data (e.g., GPS data) of the electronic devices 102, 104 over the WAN 106. By transmitting a request to the location tracker 122, one of the electronic devices (e.g., the electronic device 102) may be able to access location information for the other of the electronic devices (e.g., the electronic device 104.) Location data transmitted to and from the location tracker 122 and the electronic devices 102, 104 facilitates an assessment of proximity of the electronic devices 102, 104.

An assessment of proximity of the electronic devices 102, 104 can be performed by either the proximity-based reminder program 120 executing on one of the electronic devices 102, 104, and/or by a proximity detection module (not shown) in one of the servers of the data network 112.

When the tracked location data indicates that a predetermined pairing of devices (e.g., a pairing including the electronic devices 102, 104) are within a first predetermined distance of one another, one or more devices of the pairing may receive a proximity notification indicating that a first proximity condition is satisfied. As discussed in greater detail with respect to FIGS. 3-5, proximity can be measured in a variety of different ways. In one implementation, proximity is computed from current GPS coordinates of the electronic devices 102, 104. In other implementations, proximity is determined based on triangulation of cellular tower positions. In still other implementations, proximity is inferred based on success or failure of various communications between the electronic devices 102, 104 and/or one or more third party devices. For example, the electronic devices 102, 104 may be capable of communicating over the LAN 108 if a distance between the electronic devices 102, 104 is short enough to permit for such communications.

When the electronic devices 102, 104 are detected within the first predetermined distance of one another, one or both of the electronic devices 102, 104 receive the proximity notification via the WAN 106. In response to the proximity notification, reminder alerts are issued—either immediately, or responsive to further investigation and confirmation that one or more other proximity conditions are satisfied. As used herein, a "pending reminder alert" is a notification created in memory of an electronic device for which an associated "reminder alert" has not yet issued to a user. A reminder alert issues when one of the electronic devices 102, 104 delivers content to a user associated with the reminder. Various ways that a pending reminder alert may "issue" include without limitation generation of one or more sounds, vibrations, SMS messages, email messages, presentation of visual graphics, etc.

Some implementations of the disclosed technology exclusively or primarily use one of the WAN 106 or the LAN 108 to assess proximity and send reminder alerts. Still other implementations use the LAN 108 in conjunction with the WAN 106. In one implementation, data is transmitted across the WAN 106 to assess relative proximity within a first range (e.g., with coarse resolution), and the LAN 108 is used to assess relative proximity within a second, narrower range (e.g., with finer resolution). For example, one or both of the electronic devices 102 and 104 may receive a proximity notification indicating satisfaction of a first proximity condition via the WAN 106 and then utilize the LAN 108 to determine whether a second proximity condition is satisfied. The first proximity condition may be satisfied when, for example, the electronic devices 102, 104 are detected within a first distance of one another and the second proximity condition may be satisfied when the electronic devices 102, 104 are detected within a second distance of one another.

In one implementation, the electronic devices 102, 104 attempt a bidirectional communication across the LAN 108 to determine whether the second proximity condition is satisfied. For example, the first electronic device 102 may attempt a BlueTooth pairing with the second electronic device 104. If the BlueTooth pairing succeeds, the second proximity condition is deemed satisfied.

In another implementation, the electronic device 102 retrieves other information from the LAN 108 to determine if the second proximity condition is satisfied. For example, the electronic device 102 may retrieve voice data (e.g., from a local environment) or imagery (e.g., camera data) to determine if a particular person is in close proximity. For example, the electronic device 102 may save a voice sample of a primary user of the electronic device 104 and use a voice-matching algorithm to match the sample to the primary user's voice when the voice is detected in a local environment. Alternatively, the electronic device 102 may retrieve data from a router of the LAN 108 to determine whether one or more specific electronic devices are connected to a same local wireless network.

Figure 2:
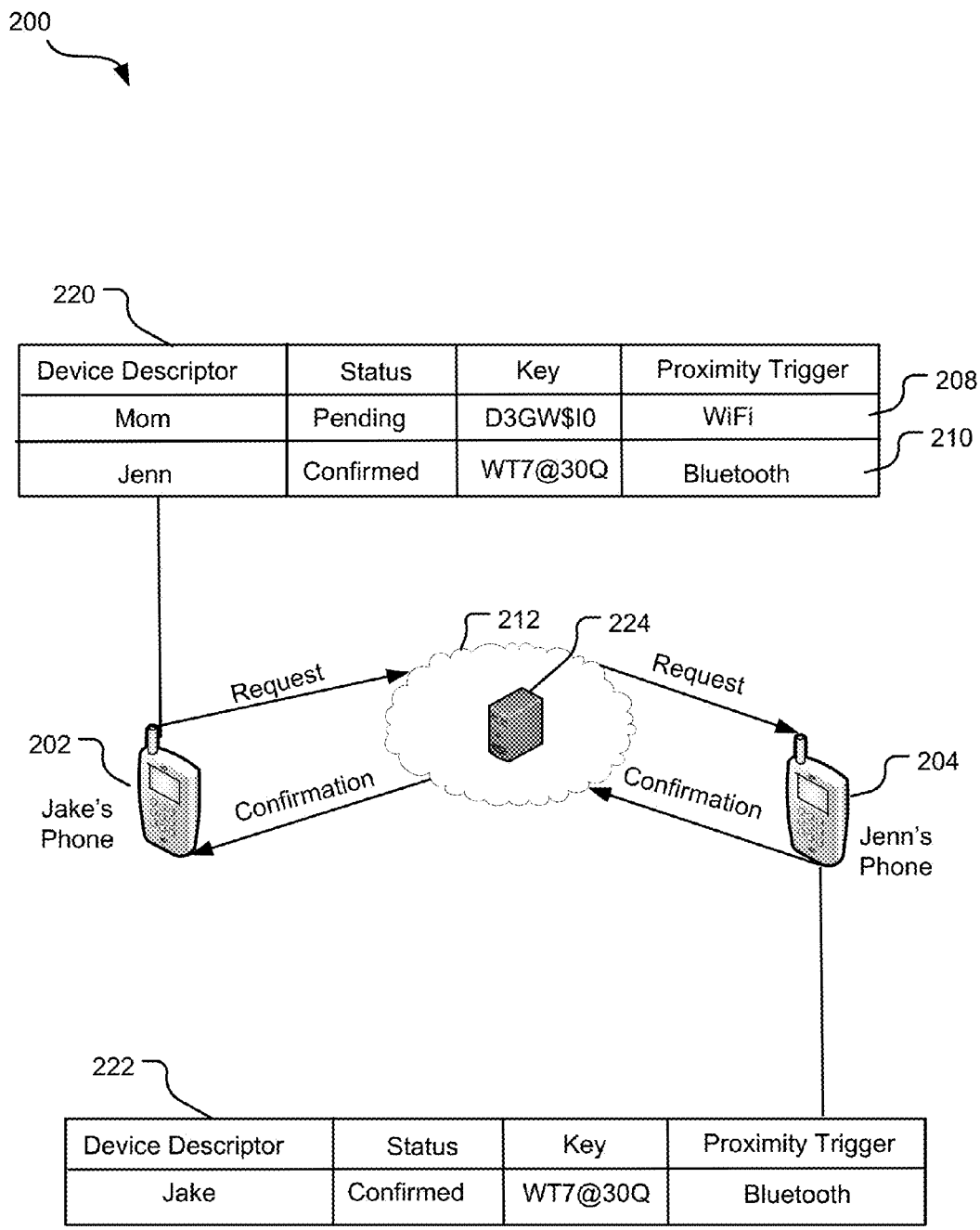
FIG. 2 illustrates a pairing request transmitted from a sending device to one or more receiving devices each executing a proximity-based reminder program.

FIG. 2 illustrates a pairing request 200 transmitted from a sending device (e.g., a first electronic device 202) to one or more receiving devices (e.g., a second electronic device 204) that are each executing a proximity-based reminder program.

Both the sending and receiving devices (e.g., the first electronic device 202 and the second electronic device 204) include memory for storing the proximity-based reminder program and one or more processors for executing the proximity-based reminder program. In addition to a processor and memory, the first electronic device 202 and the second electronic device 204 include wireless communication circuitry for communicating with one another across a WAN (e.g., one or more of a cellular network, data network, landline phone network, etc.) and also across a LAN (e.g., a BlueTooth network, Wi-Fi network, etc.).

In the example pairing request 200, a first user, 'Jake,' uses the proximity-based reminder program of the first electronic device 202 to send a pairing request from the first electronic device 202 to the second electronic device 204 owned by a second user, 'Jenn.' The pairing request 200 is transmitted to a pairing server 224 in a cloud-based data network 212 via one or more communication channels of the WAN (e.g., a cellular tower), and the pairing server 224 re-transmits the pairing request to the second electronic device 204. In another implementation, the first electronic device 202 sends the pairing request directly to the second electronic device 204 via a direct peer-to-peer connection (e.g., BlueTooth). Example hardware components of the pairing server 224 are described in detail with respect to FIG. 7.

Responsive to receipt of the pairing request at the second electronic device 204, the second user (e.g., Jenn) provides input to the proximity-based reminder program of the second electronic device 204 to confirm the pairing request 200. Acceptance of the pairing request configures both the first electronic device 202 and the second electronic device 204 to allow for issuance of reminder alerts when the sending and receiving devices are detected within a predefined proximity of one another.

The proximity-based reminder program of the second electronic device 204 uses a transmitter of the second electronic device 204 to transmit the confirmation back through the server 224 to the first electronic device 202.

Tables 220 and 222 illustrate pairing data stored in a location accessible by the proximity-based reminder program of the first electronic device 202 and the second electronic device 204, respectively. In at least one implementation, information shown in the tables 220 or 222 is included in a cloud-based storage media and not physically stored on the first electronic device 202 or the second electronic device 204.

The table 220 includes a list of pending and confirmed pairing requests and a current status of each request for the first electronic device 202 (e.g., Jake's phone). For example, the table 220 indicates that a first pairing request has been sent to a device named "Mom." This request is not yet confirmed. The table 220 further indicates that a second pairing request has been sent to a device named "Jenn" (e.g., Jenn's phone), and that this request is confirmed.

The proximity-based reminder program assigns a key identifier (as indicated in the column "key") to the pairing request when the pairing request is initiated. Once a pairing request is confirmed between multiple devices, the key identifier is saved in memory of the devices. Each key identifier is further saved in association with a device descriptor (as indicated in the column "device descriptor"). When the pairing request is confirmed between devices, the devices are "paired" (e.g., mutually configured to receive reminder alerts based on a detected distance among devices of the pair).

Table 222 illustrates one example implementation where the second electronic device 204 saves a key 'WT7@30Q' in association with a device descriptor ("Jake") signifying a pairing with the electronic device 202. This same key is also stored in table 220 of the first electronic device 202 in association with the confirmed pairing to the second electronic device 204. The tables 220 and 222 further store a "proximity trigger" in association with each pairing. The proximity trigger specifies a type of communication to use in assessing proximity for associated devices (e.g., Wi-Fi, BlueTooth, GPS).

The various proximity triggers stored in association with the pairing requests may be optionally selected by a user or, alternatively, set by default parameters of the proximity-based reminder program. For example, a user may be able to navigate a graphical user interface (GUI) and select a proximity trigger from a list of options, such as by way of a drop-down menu of selectable items, radio buttons, etc. In table 220, example proximity triggers include "Wi-Fi" and "BlueTooth," both of which are discussed in greater detail below.

A first proximity trigger 208 is set to "Wi-Fi," indicating that the proximity-based reminder system is configured to issue pending reminder alert(s) when the associated paired devices (e.g., the first electronic device 202 and the second electronic device 204) are detected on a same Wi-Fi network.

In contrast, a second proximity trigger 210 is set to "BlueTooth," indicating that the proximity-based reminder system is configured to issue pending reminder alert(s) when the associated paired devices are in close enough proximity to bidirectionally communicate via a BlueTooth connection.

The tables 220 and 222 may also store proximity condition parameters specifying other criteria for satisfying a proximity condition which triggers issuance of one or more pending reminder alerts. For instance, proximity condition parameters may specify particular devices on which associated reminder alerts are to issue (e.g., Jake's phone, Jenn's phone, or both phones); a particular distance at which at the proximity condition is deemed satisfied; a means of issuing associated reminder alerts (e.g., vibration, noise, SMS message); and other information related to triggering and issuance of reminder alerts.

In one implementation, a user selects a proximity trigger (e.g., Wi-Fi, BlueTooth, GPS, etc.) and optionally selects one or more proximity condition parameters defining circumstances of a proximity condition. When the proximity-based reminder program determines that the proximity condition is satisfied, the proximity-based reminder program triggers issuance of one or more pending reminder alerts and/or initiates further investigation of actual proximity between the associated paired devices.

In FIG. 2, Jake uses the proximity-based reminder program on the electronic device 202 to define a specific mode of proximity detection. By selecting "Wi-Fi" as the proximity trigger, Jake instructs the proximity-based reminder program to periodically ping a current wireless router to determine whether the associated device ("Mom") is connected to a same Wi-Fi network. If Jake specifies a particular Wi-Fi network (e.g., one example proximity condition parameter), such as by selecting a Wi-Fi network from a list of previously-connected Wi-Fi networks, Jake may further instruct the proximity-based reminder program to send the pings exclusively when the current wireless router is a router of his home wireless network. If, in this scenario, Jake uses the proximity-based reminder program to generate a pending reminder alert stating: "remind Mom to sign my report card," the pending reminder alert issues a reminder alert on Jake's phone and/or Mom's phone (depending on other applicable proximity condition parameters) when both "Mom" and "Jake" are connected the wireless network in Jake's house.

If Jake uses an interface of the electronic device 204 to generate a pending reminder alert associated with the second electronic device 204 (e.g., "remind me to return Jenn's math book"), the proximity-based reminder system issues a reminder alert on Jake's phone (e.g., the first electronic device 202) when Jenn's phone (e.g., the second electronic device 204) is in a close enough distance to bi-directionally communicate with Jake's phone over a BlueTooth connection.

In one implementation, a proximity condition parameter allows a user to specify a proximity trigger on a per-reminder basis rather than a per-device basis. For example, Jake may specify that one pending reminder alert associated with "Jenn" is to issue a reminder alert based on a connection to the same Wi-Fi network and another pending reminder alert associated with "Jenn" is to issue a reminder alert based on a successful BlueTooth pairing.

Proximity triggers and associated proximity condition parameters of the proximity-based reminder program can be set via default criteria or optionally provided by a user, such as providing input through a user interface (e.g., text-based input, touch screen or touchpad input), etc. In other implementations, proximity triggers and proximity condition reminders are collected from a user who speaks into a microphone of the first electronic device 202 or the second electronic device 204. For instance, the proximity-based reminder program may use a speech recognition program to decipher spoken user instructions to alter one or set or more proximity condition parameters.

In one implementation, the proximity-based reminder program generates reminder alerts based on voice recognition. For example, the proximity-based reminder program saves voice sample(s) from one or more users in association with each pending and/or confirmed pairing request. The proximity-based reminder program accesses a device microphone to monitor sounds in a local environment and compares sounds to the saved voice samples. If the proximity-based reminder program determines that a detected sound matches one of the saved voice samples, the proximity-based reminder program issues any associated pending reminder alerts.

In another implementation, the proximity-based reminder program generates reminder alerts based on GPS coordinates of paired devices. Methods for retrieving GPS coordinates and calculating distance are discussed below in greater detail with respect to FIGS. 3 and 4.

Figure 3:
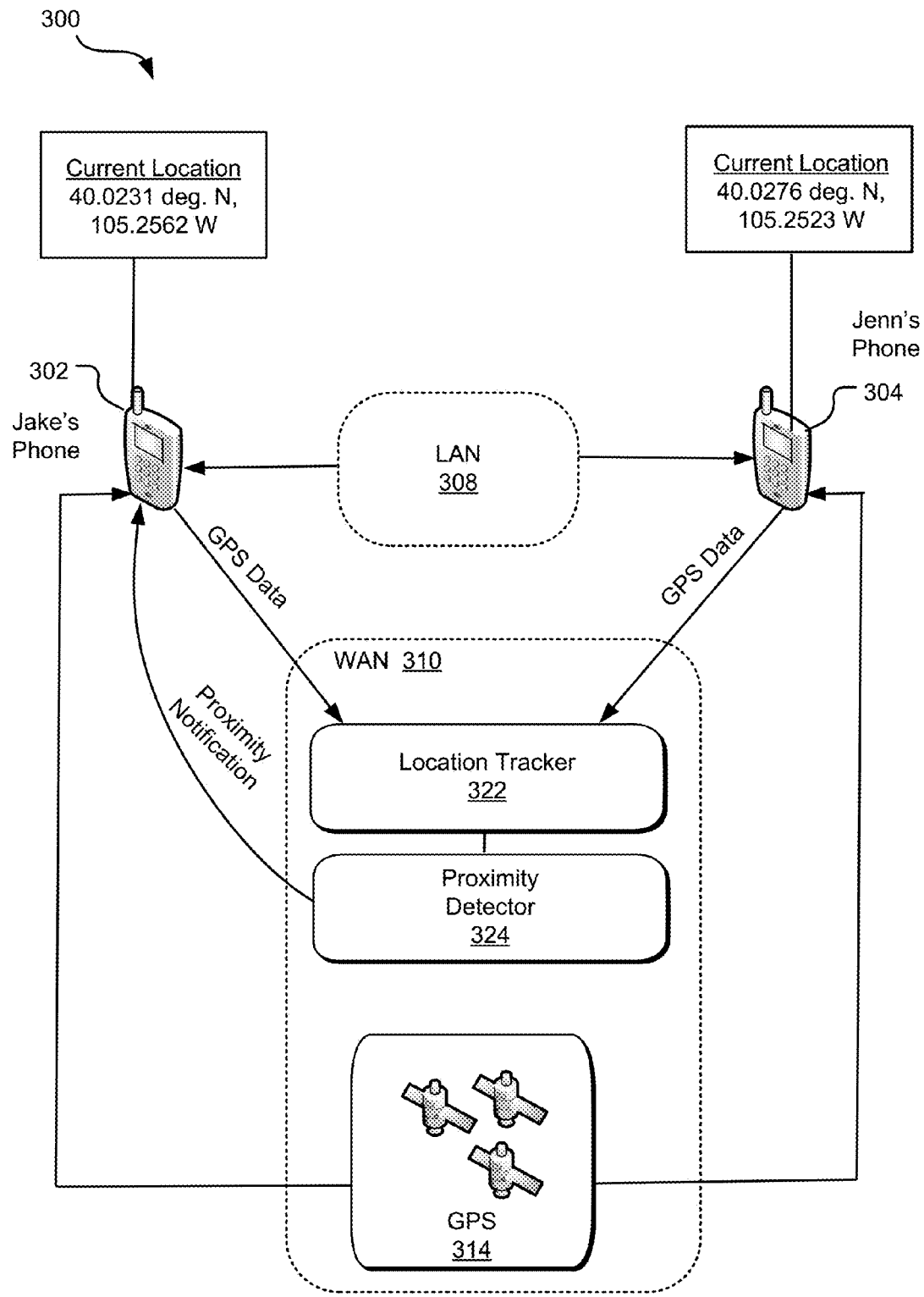
FIG. 3 illustrates an example proximity-based reminder system including various programs embodied in memory of different electronic devices.

FIG. 3 illustrates an example proximity-based reminder system 300 including various programs embodied in memory of different electronic devices. The proximity system 300 includes at least a first electronic device 302 and a second electronic device 304 that store and execute a proximity-based reminder program. Different features of the proximity-based reminder program enable generation and acceptance of pairing requests (as described with respect to FIG. 2). Once two or more devices are paired by the proximity-based reminder program, the devices may generate, store, and issue pending reminder alerts based on their relative proximities to one another. In FIG. 3, the first electronic device 302 and the second electronic device 304 (hereinafter, the "paired devices") are communicatively coupled with one another across a WAN 310 and a LAN 308.

The proximity-based reminder system 300 further includes a location tracker 322 that periodically receives and stores or re-transmits location data from the paired devices. Such location data may be provided by the paired devices autonomously or responsive to a request of the location tracker 322. In FIG. 3, the location tracker 322 is embodied in software and/or hardware of an electronic device connected to the WAN 310 and external to either of the paired devices.

Each of the paired devices stores a data structure including a location field (e.g., "Current Location") storing current location data. In one implementation, the location data is data transmitted from one or more 314 satellites and captured by a GPS receiver in each of the paired devices. The paired devices periodically send GPS information to the location tracker 322. For example, the first electronic device 302 (e.g., "Jake's phone) and the second electronic device 304 (e.g., "Jenn's phone") may periodically (e.g., at a scheduled time or upon request) send current GPS coordinates to the location tracker 322 by way of nearest cellular tower, data network, etc. The location tracker 322 conveys such location information to a proximity detector 324 for proximity assessment.

The proximity detector 324 includes various computer-executable instructions for performing tasks related to proximity detection. The computer-execution instructions may include, for example, instructions for transmitting requests for location data to the location tracker 322 and instructions for processing location data. The proximity detector 324 detects proximity by analyzing information transmitted across the WAN 310.

In the illustrated example, the proximity detector 324 is embodied in software and/or hardware external to either of the paired devices. For example, the proximity detector 324 is executed by a processor of a third party device, such as a server of a data network. In another implementation (e.g., the implementation of FIG. 4), the proximity detector 324 is embodied as firmware in one of the paired devices.

The proximity detector 324 calculates a distance between the paired devices using the location data from the location tracker 322. For example, the proximity detector 324 calculates a distance between the first electronic device 302 and the second electronic device 304 (e.g., at predefined intervals) responsive to receipt of updated GPS information from one or both of the paired devices at the location tracker 322.

If the proximity detector 324 determines that the calculated distance satisfies a first proximity condition, the proximity detector 324 transmits a proximity notification to one or both of the first electronic device 302 and the second electronic device 304. In one implementation, the proximity notification triggers issuance of a pending reminder alert. In another implementation, the proximity notification triggers one or more further investigative actions.

In one implementation, a first proximity notification instructs a receiving device to gather more information to better assess proximity of the paired electronic devices. If the additional information is sufficient to satisfy a second (e.g., different) proximity condition, one or more reminder alerts are then issued to user(s) of the first electronic device 302 and/or the second electronic device 304. For example, the proximity detector may transmit a proximity notification to the electronic device 302 confirming proximity detection based on an assessment of GPS data. Responsive to receipt of the proximity notification, the proximity-based reminder program of the electronic device 302 attempts a bidirectional communication with the electronic device 304 over the LAN 308. If the communication is successful, it is determined that a second proximity condition is satisfied and the one or more pending reminder alerts are issued. Examples of bidirectional communication are discussed in greater detail below with respect to FIG. 5.

Figure 4:
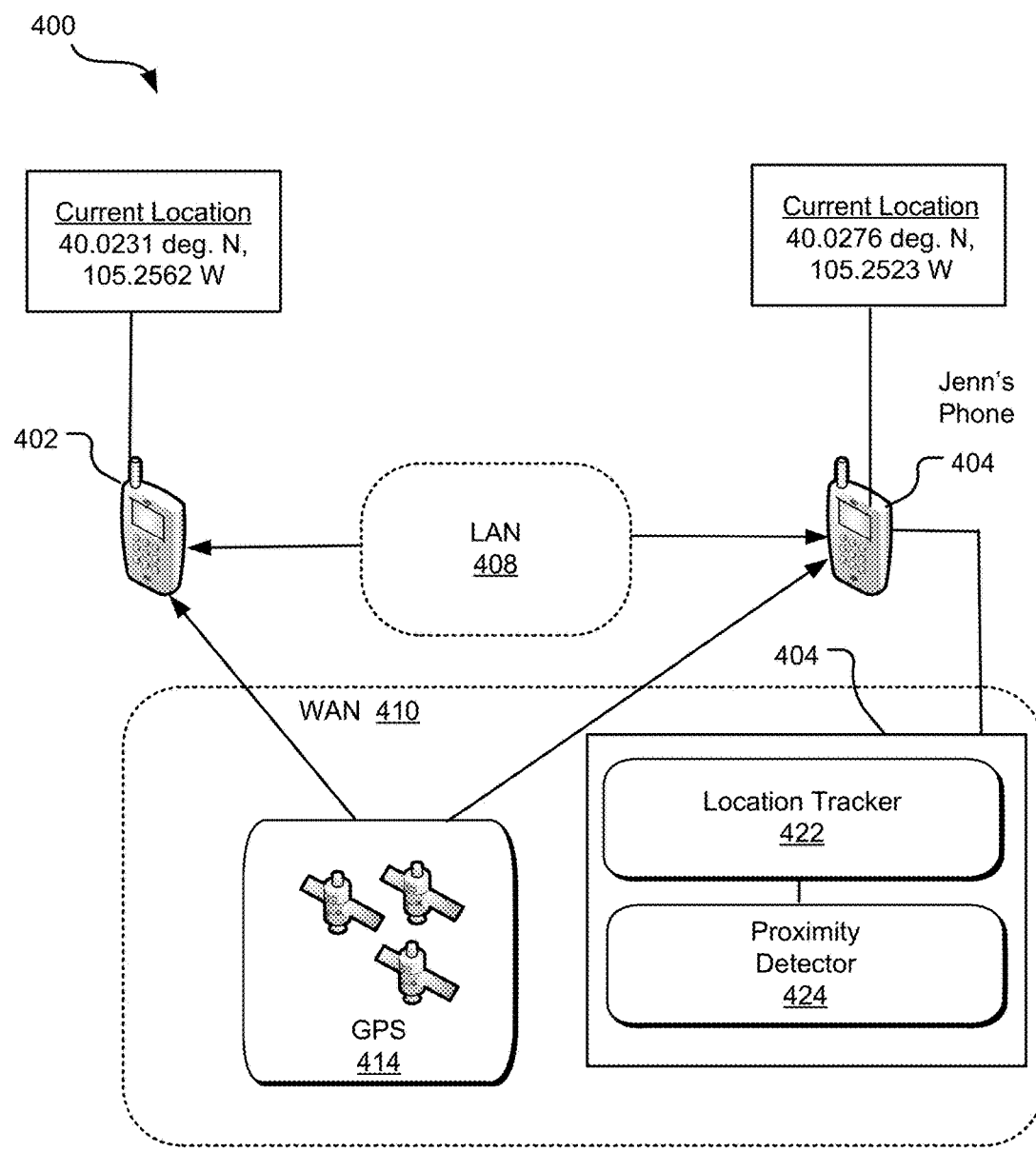
FIG. 4 illustrates another example proximity-based reminder system including various programs embodied in memory of different electronic devices.

FIG. 4 illustrates another example proximity-based reminder system 400 including various programs embodied in the memory of different electronic devices. The proximity system 400 includes at least a first electronic device 402 and a second electronic device 404 that store and execute a proximity based reminder program. Different features of the proximity-based reminder program enable generation and acceptance of pairing requests that configure electronic devices to receive proximity-based reminder alerts. In FIG. 4, first electronic device 402 and the second electronic device 404 (the "paired devices") are paired through the proximity-based reminder program, and are therefore configured to generate, store, and issue pending reminder alerts based on their relative proximities to one another.

The proximity-based reminder system 400 includes a location tracker 422 for tracking relative locations of the paired devices and a proximity detector 424 for performing tasks related to proximity detection. Both the location tracker 422 and the proximity detector 424 are embodied in firmware of one of the paired devices (e.g., the electronic device 404). The location tracker 422 includes processor-executable instructions for requesting location data from other electronic devices, while the proximity detector 424 includes processor executable instructions for assessing proximity between two or more devices using the location data.

Location data is data transmitted from one or more GPS satellites 414 and captured by a GPS receiver in each of the paired devices. This location data is stored in a location field (e.g., "Current Location") of each respective one of the paired devices. The location tracker 422 (in the electronic device 404) may request and receive the location data from the electronic device 404 over a WAN 410 or a LAN 408.

The proximity detector 424 calculates a distance between the paired devices using the location data transmitted from and/or stored within each of the devices. For example, the proximity detector 424 calculates a distance between the first electronic device 402 and the second electronic device 404 (e.g., at predefined intervals) responsive to request and receipt of updated GPS information.

If the proximity detector 424 determines that the calculated distance satisfies a first proximity condition, the proximity detector 424 sends a proximity notification and/or triggers issuance of pending reminder alert(s). In one implementation, the proximity detector 424 sends a proximity notification that instructs receiving device(s) to initiate further investigative actions to gather more information about the degree of proximity between the paired devices. For example, the proximity detector 424 may send a proximity notification by way of initiating a bidirectional communication between the electronic device 404 and the electronic device 402. If this communication is successful, the proximity detector 424 determines that the second proximity condition is successful and the pending reminder alerts are issued. Examples of bidirectional communication are discussed in greater detail below with respect to FIG. 5.

Figure 5:
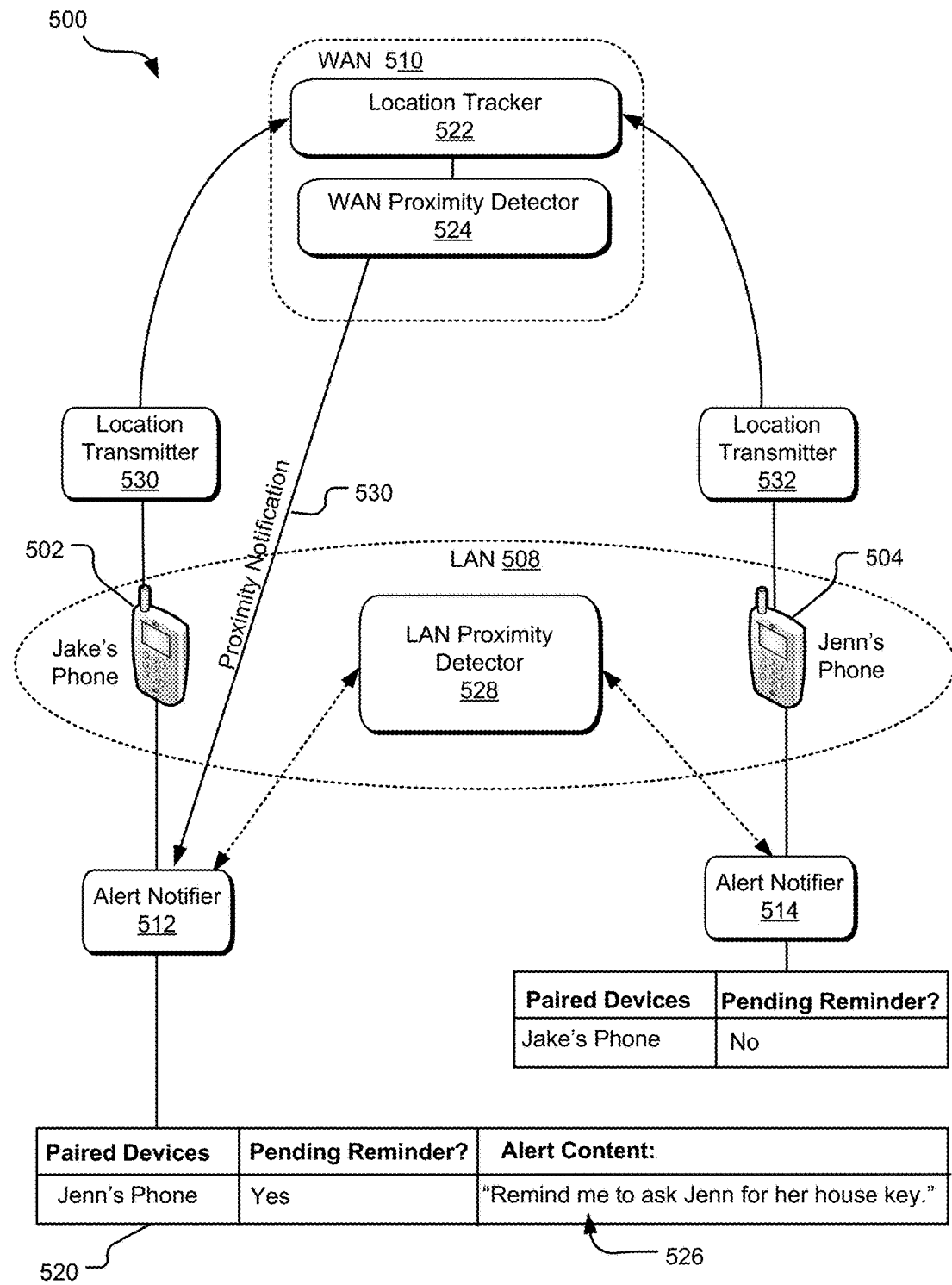
FIG. 5 illustrates yet another proximity-based reminder system for issuing reminder alerts based on a distance between two or more paired devices.

FIG. 5 illustrates another proximity-based reminder system 500 for issuing reminder alerts based on a distance between two or more paired devices. The proximity-based reminder system 500 includes at least a first electronic device 502 and a second electronic device 504 that stores and executes a proximity-based reminder program. The first electronic device 502 and the second electronic device 504 are paired, in a memory location, for the purpose of enabling proximity-based reminder alerts via the proximity-based reminder program.

The first electronic device 502 and the second electronic device 504 (the "paired devices") each include an associated alert notifier 512 or 514 embodied in software and/or hardware, such as in firmware of each of the respective paired devices. The alert notifiers 512 and 514 access and manage a table storing information relating to pending reminder alerts saved in association with the paired devices. For example, a table 520 indicates that there is a pending reminder alert 526 for the first electronic device 502 (e.g., Jake's phone) that may issue based on a detected proximity to the second electronic device 504 (e.g., Jenn's phone).

The first electronic device 502 and the second electronic device 504 each further include a location transmitter (e.g., location transmitters 530 and 532) including computer-executable instructions for transmitting location data (e.g., GPS data) of each of the paired devices to a location tracker 522 over a WAN 510.

Location data may be sent to the location tracker 522 responsive to a request from the location tracker 522 or by way of an autonomous transmission action initiated by one of the paired devices. In one implementation, the location tracker 522 is executed by a server external to the paired devices (e.g., as in the location tracker 322 described with respect to FIG. 3). In other implementations, the location tracker 522 is embodied in firmware of one or both of the paired devices (e.g., as in the location tracker 422 described with respect to FIG. 4).

The location tracker 522 conveys location data to a WAN proximity detector 524, which periodically assesses proximity of the paired devices. In one implementation, the WAN proximity detector 524 is embodied in memory of a third party device (e.g., as in the proximity detector 324 of FIG. 3). In another implementation, the WAN proximity detector 524 is embodied in firmware of the paired devices (e.g., as in the proximity detector 424 of FIG. 4). In yet another implementation, the location tracker 522 and the WAN proximity detector 524 are embodied in firmware of both devices and proximity detection tasks are delegated based on an origin of a pending reminder alert. If, for example, the pending reminder alert 526 is created by the proximity-based reminder program of the first electronic device 502, location tracking and proximity detection tasks are performed exclusively by the location tracker 522 and WAN proximity detector 524 of the first electronic device.

The WAN proximity detector 524 determines whether location data (e.g., GPS coordinates) of the paired devices satisfy a first proximity condition. A particular distance for satisfying the first proximity condition may vary in different implementations and, in some implementations, is optionally selectable by a user. For example, the distance for satisfying the first proximity condition may be 1-mile, half a mile, etc. When the WAN proximity detector 524 determines that the first proximity condition is satisfied, the WAN proximity detector 524 transmits a proximity notification 540 to one or both of the alert notifiers 512 and 514 depending on proximity detection parameters specifying which of the paired devices are to issue associated reminder alerts.

Receipt of the proximity notification 540 triggers one or more actions by the alert notifiers 512 or 514. In implementation, the alert notifier 512 receives the proximity notification 540 and proceeds to issue one or more pending reminder alerts, such as the pending reminder alert 526.

In another implementation, neither of the alert notifiers 512 or 514 issue pending reminder alerts until further proximity investigation confirms satisfaction of one or more additional proximity criteria. In FIG. 5, the alert notifier 512 queries a LAN 508 proximity detector 528 for additional proximity information in response to receipt of the proximity notification 540. One purpose of this query to the LAN proximity detector 528 is to determine whether a physical proximity of paired devices is suitable for issuing the pending reminder alert 526. The LAN proximity detector 528 may be, for example, hardware and/or software embodied in one or both of the paired devices.

In one implementation, the LAN proximity detector 528 assesses satisfaction of a second proximity condition. If the second proximity condition is satisfied, the LAN proximity detector 528 instructs one or both of the alert notifiers 512, 514 to issue pending reminder alerts associated with the paired devices. Satisfaction of the second proximity condition may indicate a determination of increased proximity as compared to satisfaction of the first proximity condition. For example, the first proximity condition may be satisfied if paired devices are separated from one another by a maximum distance of one mile while the second proximity condition is satisfied if the paired devices are separated from one another by a maximum distance of a few hundred feet.

In one implementation, the LAN proximity detector 528 attempts a bidirectional communication, such as a BlueTooth pairing, between the paired devices. If the bidirectional communication succeeds, the second proximity condition is satisfied and the pending reminder alert 526 is issued.

In another implementation, the LAN proximity detector 528 uses a microphone to "listen" to noises of a surrounding environment. The LAN proximity detector 528 analyzes the noises with voice-detection software to determine whether a particular person is in close proximity. For example, the alert notifier 512 may receive the proximity notification 540 and instruct the LAN proximity detector 528 to enter a "listening phase." If the LAN proximity detector 528 detects a particular voice (e.g., Jenn's voice), the LAN proximity detector 528 determines that the second proximity condition is satisfied and issues the pending reminder alert 526.

In yet another implementation, the LAN proximity detector 528 determines whether the second proximity condition is satisfied based on other information available via the LAN. For example, the LAN proximity detector 528 may determine whether or not the paired devices are connected to a common Wi-Fi network. If the paired devices are connected to a common Wi-Fi network, the second proximity condition is satisfied and the pending reminder alert 526 is issued.

In still yet another implementation, the LAN proximity detector 528 uses a camera and facial recognition techniques to verify whether the second proximity condition is satisfied. For example, the alert notifier 512 may determine that a camera on Jake's device (e.g., the first electronic device 502) has captured an in-person image of Jenn and issue the pending reminder alert 526 responsive to such determination.

In situations where the LAN proximity detector 528 determines that the second proximity condition is not satisfied, no reminder alerts are issued. The paired devices continue to send GPS and other self-identifying information to the WAN proximity detector 524 so long as pending reminder alerts remain. The WAN proximity detector 524 may periodically re-send the proximity notification 540 to instruct the LAN proximity detector 524 to re-assess whether the second proximity condition is satisfied.

Pending reminder alerts of the multi-device proximity-based reminder system 500 can be issued in a number of ways including without limitation by generating one or more noises (e.g., alarms), SMS messages, vibrations, etc. If there are multiple pending reminder alerts associated with the paired devices, different reminder alerts may issue on different devices. For example, some reminder alerts may issue on Jake's phone and others may issue on Jenn's phone, depending on various factors including without limitation the origin of the reminder, user-selectable options, and other design criteria. If a reminder is a multi-party reminder, two or more paired devices may issue identical reminder alerts.

In one implementation, calendar data stored on one or more electronic devices is used to assist in a determination of proximity between two or more paired devices. For example, a calendar program of the first electronic device 502 may interface with the proximity-based reminder program so that a pending reminder alert is automatically generated when a user programs an event into the calendar program by providing certain information. For example, an event entry in the calendar program may contain a specific time and user identifier (e.g., "lunch meeting with Jenn at 1:00 pm). If the user identifier matches a device descriptor (e.g., the device descriptors of FIG. 2) saved in a table of the proximity-detection program, the proximity-based reminder program may automatically set a pending reminder alert for the pairing associated with the device descriptor at the time of the scheduled event (e.g., 1:00 pm). The WAN proximity detector 524 and/or the LAN proximity detector 528 may perform one or more actions at the time of the scheduled event to test whether one or more predetermined proximity conditions are satisfied.

In still other implementations, the proximity-based reminder system 500 is used to generate reminder alerts based on a detected increase (rather than a decrease) in distance between two or more paired devices. For example, one or more associated alerts may trigger when the two or more paired devices are first detected with a predetermined proximity of one another and an increase in distance between the two or more devices is subsequently detected. In at least one implementation, a user can optionally set the reminder alert to trigger based on the detected increase, as described above.

Figure 6:
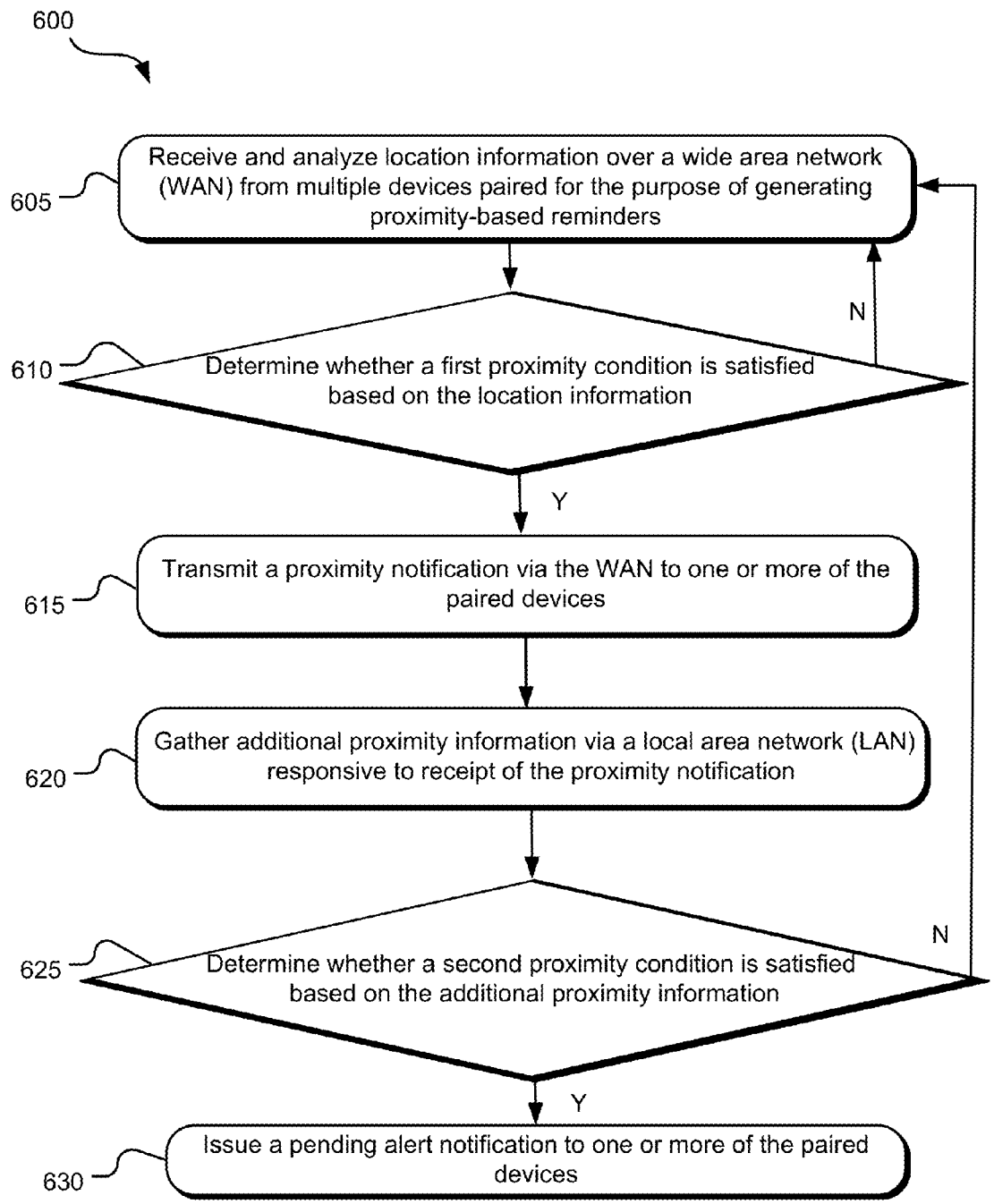
FIG. 6 illustrates example operations for issuing a proximity-based reminder alert.

FIG. 6 illustrates example operations 600 for issuing a proximity-based reminder alert. A receiving and analyzing operation 605 receives location data from one or more devices over a WAN and analyzes the location data to assess proximity of two or more devices that have been paired (e.g., associated in memory) for the purpose of generating proximity-based reminders. In one implementation, the receiving and analyzing operation 605 is performed by firmware of one of the paired devices. In another implementation, the receiving and analysis of the location data is performed by another device, such as a third-party server.

A first determination operation 610 determines whether a first proximity condition is satisfied based on the received positioning information. In one implementation, the first proximity condition is satisfied when received location data indicates that the paired devices are within a predetermined physical distance of one another.

If the first determination operation 610 determines that the first proximity condition is not satisfied, the receiving operation 605 continues to receive and monitor the positioning information from the paired devices. If, on the other hand, the first determination operation 610 determines that the first proximity condition is satisfied, a transmitting operation 615 transmits a proximity notification via the WAN to one or more of the paired devices, depending on which of the devices is tasked with executing associated reminder alert (s).

Responsive to receipt of the proximity notification via the transmitting operation 615, a gathering operation 620 gathers additional proximity information by transmitting and receiving data across a LAN. For example, the gathering operation 620 may gather information via peer-to-peer connections, via local network connections (e.g., a Wi-Fi network), or by gathering sounds, imagery, or other data from a local environment.

A second determining operation 625 determines whether a second proximity condition is satisfied based on the additional proximity information gathered by the gathering operation 620. In one implementation, the second proximity condition is satisfied when it is determined that the paired devices are each connected to a same Wi-Fi network. In another implementation, the second proximity condition is satisfied when the paired devices communicate bidirectionally across the LAN. For example, the second proximity condition may be satisfied when a successful BlueTooth connection is established between the paired devices. In still other implementations, satisfaction of the second proximity condition depends on facial recognition data and/or voice recognition data.

If the second determining operation 625 determines that the second proximity condition is satisfied, an alert notifier 630 issues a reminder alert for any pending reminders saved in association with the pairing. The issued reminder alert may take on a variety of forms including without limitation sound, vibration, visual graphic, SMS message, email message, etc.

Figure 7:
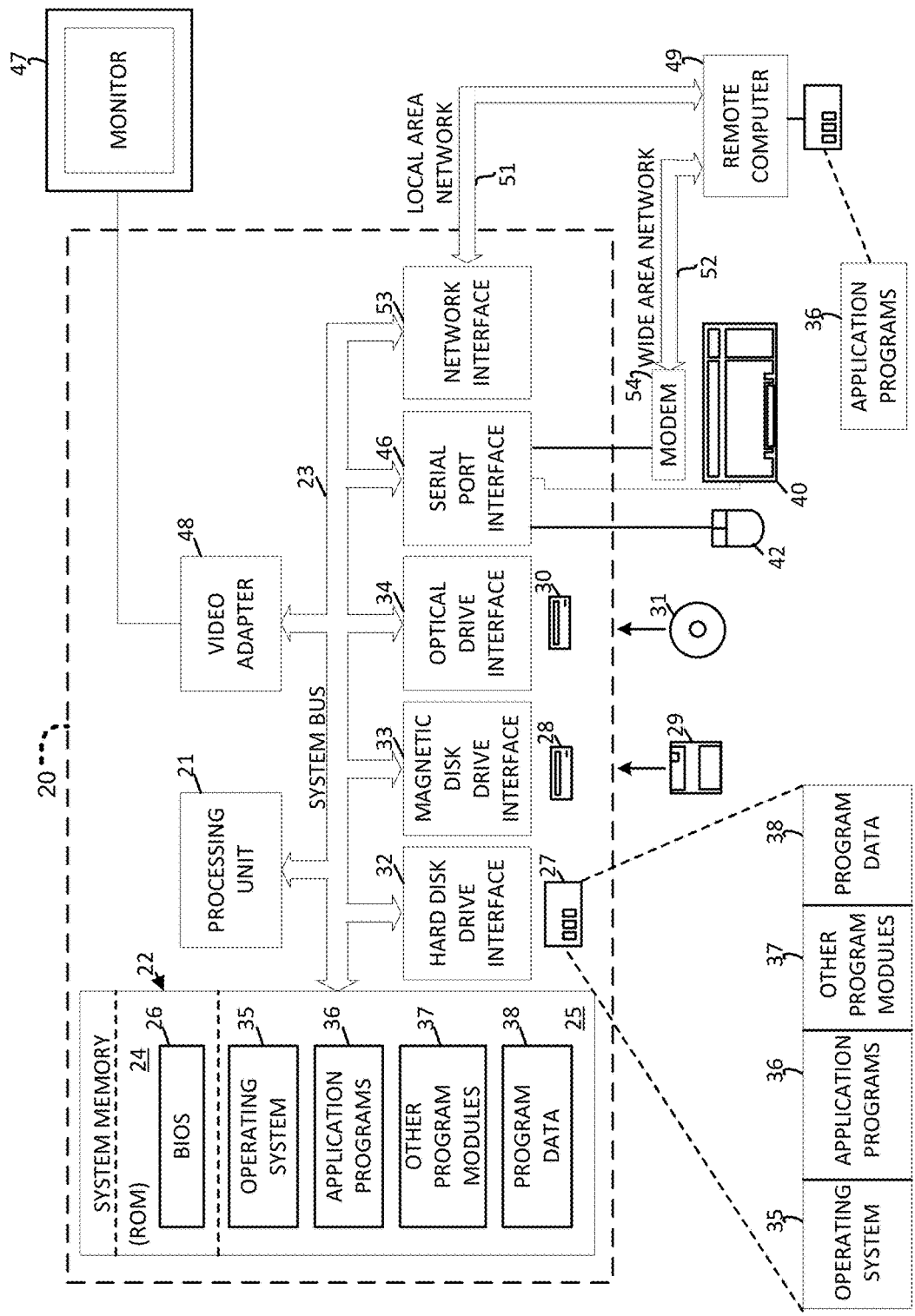
FIG. 7 illustrates an example system that may be useful in implementing the described technology.

FIG. 7 illustrates an example system that may be useful in implementing the described technology. The example hardware and operating environment of FIG. 7 for implementing the described technology includes a computing device, such as a general purpose computing device in the form of a computer 20, a mobile telephone, a personal data assistant (PDA), a tablet, smart watch, gaming remote, or other type of computing device. In the implementation of FIG. 6, for example, the computer 20 includes a processing unit 21, a system memory 22, and a system bus 23 that operatively couples various system components including the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the implementations are not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated tangible computer-readable media provide nonvolatile storage of computer-readable instructions, data structures, program modules and other data for the computer 20. It should be appreciated by those skilled in the art that any type of tangible computer-readable media may be used in the example operating environment.

A number of program modules may be stored on the hard disk, magnetic disk 29, optical disk 31, ROM 24, or RAM 25, including an operating system 35, one or more application programs 36, other program modules 37, and program data 38. A user may generate reminders on the personal computer 20 through input devices such as a keyboard 40 and pointing device 42. Other input devices (not shown) may include a microphone (e.g., for voice input), a camera (e.g., for a natural user interface (NUI)), a joystick, a game pad, a satellite dish, a scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as a remote computer 49. These logical connections are achieved by a communication device coupled to or a part of the computer 20; the implementations are not limited to a particular type of communications device. The remote computer 49 may be another computer, a server, a router, a network PC, a client, a peer device or other common network node, and typically includes many or all of the elements described above relative to the computer 20. The logical connections depicted in FIG. 7 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program engines depicted relative to the personal computer 20, or portions thereof, may be stored in the remote memory storage device. It is appreciated that the network connections shown are example and other means of communications devices for establishing a communications link between the computers may be used.

In an example implementation, software or firmware instructions for generating proximity-based reminder alerts may be stored in memory 22 and/or storage devices 29 or 31 and processed by the processing unit 21. For example, the memory 22 may store a location tracker and a proximity detector and/or storage devices 29 or 31 may store the location tracker and proximity detector as persistent datastores.

Figure 8:
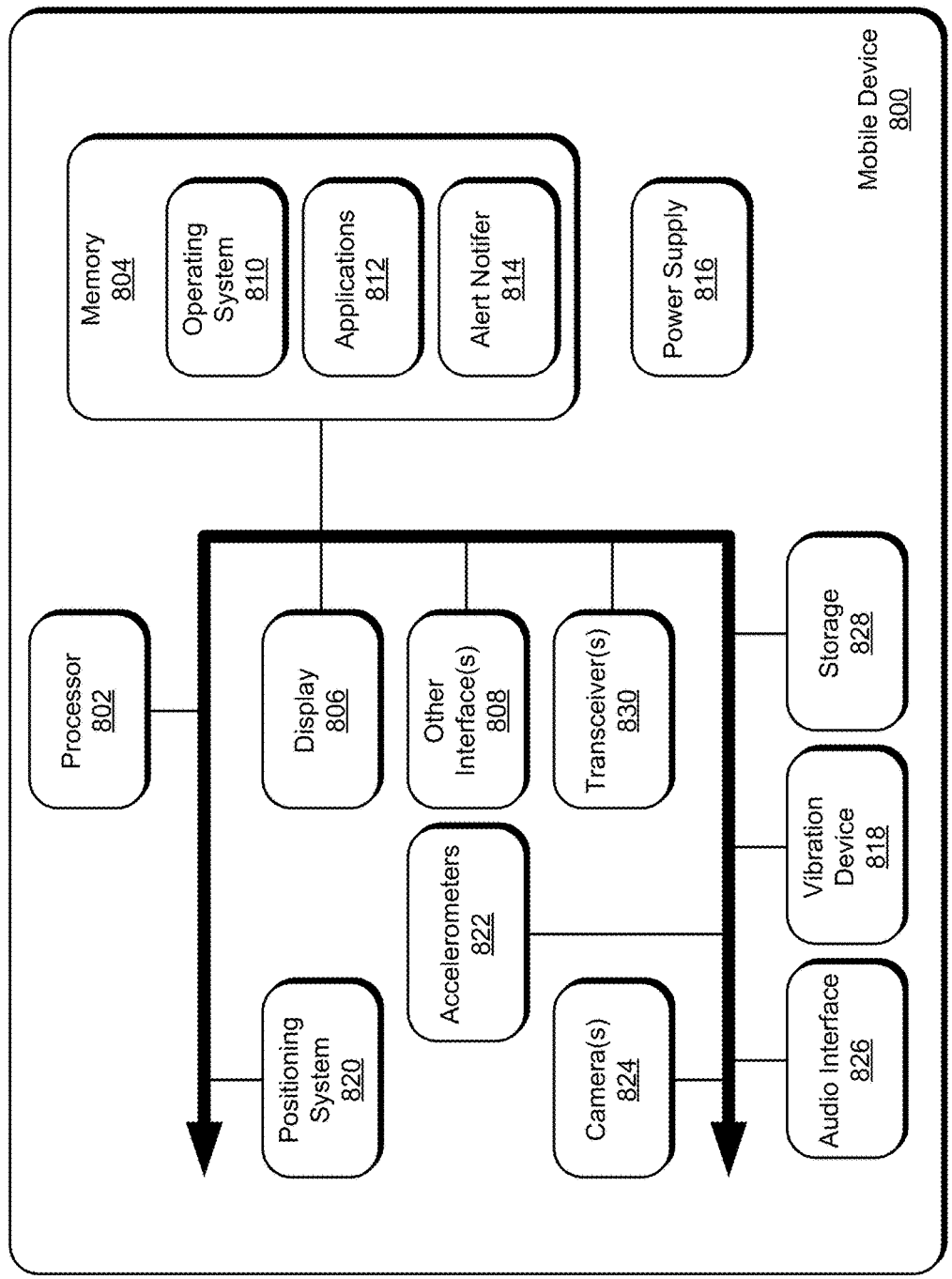
FIG. 8 illustrates another example system that may be useful in implementing the described technology.

FIG. 8 illustrates another example system (labeled as a mobile device 800) that may be useful in implementing the described technology. The mobile device 800 includes a processor 802, a memory 804, a display 806 (e.g., a touch-screen display), and other interfaces 808 (e.g., a keyboard). The memory 804 generally includes both volatile memory (e.g., RAM) and non-volatile memory (e.g., flash memory). An operating system 810, such as the Microsoft Windows® Phone operating system, resides in the memory 804 and is executed by the processor 802, although it should be understood that other operating systems may be employed.

One or more application programs 812, such as a proximity-based reminder application, are loaded in the memory 804 and executed on the operating system 810 by the processor 802. An alert notifier 814 is also loaded in the memory 804 and is executed by the processor 802 to present notifications to the user. For example, when a proximity-based reminder is triggered, the alert notifier 814 can cause the mobile device 800 to beep or vibrate (via the vibration device 818) and display text indicating the reminder. A location tracker and/or proximity detector may be included in applications 812. Pairing information such as pairing request statuses, paired devices, pairing keys, device descriptors, proximity triggers proximity condition parameters, current GPS location(s), pending alerts, and other data may be stored in the memory 804 in association with applications 812.

The mobile device 800 includes a power supply 816, which is powered by one or more batteries or other power sources and which provides power to other components of the mobile device 800. The power supply 816 may also be connected to an external power source that overrides or recharges the built-in batteries or other power sources.

The mobile device 800 includes one or more communication transceivers 830 to provide network connectivity (e.g., mobile phone network, Wi-Fi®, BlueTooth®, etc.). The mobile device 800 also includes various other components, such as a positioning system 820 (e.g., a global positioning satellite transceiver), one or more accelerometers 822, one or more cameras 824, an audio interface 826 (e.g., a microphone, an audio amplifier and speaker and/or audio jack), and additional storage 828. Other configurations may also be employed.

In an example implementation, a mobile operating system, various applications, and other modules and services may be embodied by instructions stored in memory 804 and/or storage devices 828 and processed by the processing unit 802. User preferences, service options, and other data may be stored in memory 804 and/or storage devices 828 as persistent datastores.

Mobile device 800 and computer 20 may include a variety of tangible computer-readable storage media and intangible computer-readable communication signals. Tangible computer-readable storage can be embodied by any available media that can be accessed by the mobile device 800 or the computer 20 and includes both volatile and nonvolatile storage media, removable and non-removable storage media. Tangible computer-readable storage media excludes intangible communications signals and includes volatile and nonvolatile, removable and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by mobile device 800 or computer 20. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Some embodiments may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of exemplary implementations. Since many implementations can be made without departing from the spirit and scope of the claimed invention, the claims hereinafter appended define the invention. Furthermore, structural features of the different examples may be combined in yet another implementation without departing from the recited claims.

What is claimed is:

1. An electronic device comprising:
   a receiver to receive a notification indicating that a first distance between a first electronic device and a second electronic device satisfies a first proximity condition, satisfaction of the first proximity condition determined using a first proximity detection mode;
   a proximity detector to determine whether a second distance satisfies a second proximity condition using a second proximity detection mode responsive to the received notification and satisfaction of the first proximity condition, the second distance being less than the first distance; and
   an alert notifier to be executed by one or more processors that issues a proximity-based reminder alert on the first electronic device responsive to satisfaction of the second proximity condition by the second distance.

2. The electronic device of claim 1 wherein the first proximity detection mode is based on an analysis of GPS coordinates of at least one of the first electronic device and the second electronic device to determine whether the first distance satisfies the first proximity condition.

3. The electronic device of claim 1 wherein the first proximity detection mode is based on an analysis of cellular network data of at least one of the first electronic device and the second electronic device to determine whether the first distance satisfies the first proximity condition.

4. The electronic device of claim 1 wherein the second proximity detection mode is based on information exchanged over a local area network (LAN) to determine whether the second distance satisfies the second proximity condition.

5. The electronic device of claim 1 wherein the second proximity detection mode is based on peer-to-peer communications between the first electronic device and the second electronic device.

6. A system comprising:
   one or more processors;
   a pairing server to be executed by the one or more processors and configured to receive confirmation that a first electronic device and a second electronic device are paired for a purpose of enabling proximity-based reminder alerts;
   a location tracker to be executed by the one or more processors and configured to determine when a distance between the first electronic device and the second electronic device satisfies a first proximity condition using a first proximity detection mode; and
   a proximity detector to be executed by the one or more processor and configured to transmit a communication to the first electronic device when the first proximity condition is satisfied, the communication initiating proximity detection using a second proximity detection mode.

7. The system of claim 6, wherein the location tracker and the proximity detector are embodied in a cloud-based server.

8. The system of claim 6, wherein the location tracker and the proximity detector are embodied in firmware of at least one of the first electronic device or the second electronic device.

9. The system of claim 6, wherein the communication is a notification that instructs the first electronic device to attempt a bidirectional communication using the second proximity detection mode.

10. The system of claim 6 wherein the first proximity detection mode is based on an analysis of GPS coordinates of at least one of the first electronic device and the second electronic device to determine whether the distance satisfies the first proximity condition.

11. The system of claim 6 wherein the first proximity detection mode is based on an analysis of cellular network data of at least one of the first electronic device and the second electronic device to determine whether the distance satisfies the first proximity condition.

12. The system of claim 6 wherein the second proximity detection mode is based on information exchanged over a local area network (LAN).

13. The system of claim 6 wherein the second proximity detection mode is based on peer-to-peer communications between the first electronic device and the second electronic device.

14. A method for issuing a reminder alert based on a distance between a first electronic device and a second electronic device, the method comprising:
   receiving a notification when a first distance between the first electronic device and the second electronic device satisfies a first proximity condition, satisfaction of the first proximity condition determined using a first proximity detection mode;
   determining whether a second distance satisfies a second proximity condition using a second proximity detection mode responsive to satisfaction of the first proximity condition by the first distance and receipt of the notification, the second distance being less than the first distance; and
   issuing the reminder alert via at least one of the first electronic device and the second electronic device responsive to satisfaction of the second proximity condition by the second distance.

15. The method of claim 14, wherein the first proximity detection mode is based on an analysis of GPS coordinates of at least one of the first electronic device and the second electronic device to determine whether the first distance satisfies the first proximity condition.

16. The method of claim 14, wherein the first proximity detection mode is based on an analysis of cellular network data of at least one of the first electronic device and the second electronic device to determine whether the first distance satisfies the first proximity condition.

17. The method of claim 14 wherein the second proximity detection mode is based on information exchanged over a local area network (LAN) to determine whether the second distance satisfies the second proximity condition.

18. The method of claim 14 wherein the second proximity detection mode is based on peer-to-peer communications between the first electronic device and the second electronic device.

19. The method of claim 14, wherein determining whether the second distance satisfies the second proximity condition further comprises:
   attempting a bidirectional communication between the first electronic device and the second electronic device via a LAN responsive to receipt of the notification.

20. The method of claim 14, wherein the second proximity condition is satisfied when the first electronic device and the second electronic device are both connected to a same Wi-Fi network.

* * * * *